United States Patent
Koutsimanis et al.

(10) Patent No.: US 9,253,739 B2
(45) Date of Patent: Feb. 2, 2016

(54) METHODS AND ARRANGEMENTS FOR CONTROLLING TRANSMIT POWER IN A RADIO BASE STATION

(75) Inventors: Chrysostomos Koutsimanis, Solna (SE); Anders Furuskär, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/398,569

(22) PCT Filed: May 7, 2012

(86) PCT No.: PCT/SE2012/050482
§ 371 (c)(1),
(2), (4) Date: Nov. 3, 2014

(87) PCT Pub. No.: WO2013/169151
PCT Pub. Date: Nov. 14, 2013

(65) Prior Publication Data
US 2015/0111609 A1 Apr. 23, 2015

(51) Int. Cl.
*H04B 7/00* (2006.01)
*H04W 52/34* (2009.01)
*H04W 52/14* (2009.01)
*H04W 52/22* (2009.01)
*H04W 52/36* (2009.01)

(52) U.S. Cl.
CPC ............ *H04W 52/34* (2013.01); *H04W 52/143* (2013.01); *H04W 52/225* (2013.01); *H04W 52/228* (2013.01); *H04W 52/367* (2013.01)

(58) Field of Classification Search
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| | | | | |
|---|---|---|---|---|
| 6,330,455 B1* | 12/2001 | Ichihara | ................. | H04W 52/52 455/126 |
| 7,826,370 B1* | 11/2010 | Vargantwar | ............ | H04L 1/0007 370/235 |
| 2002/0147022 A1* | 10/2002 | Subramanian | ....... | H04L 12/5693 455/453 |
| 2005/0265292 A1* | 12/2005 | Atsuta | ..................... | H04W 52/34 370/335 |
| 2007/0184863 A1* | 8/2007 | Takagi | ................. | H04W 52/346 455/507 |
| 2008/0111661 A1* | 5/2008 | Lin | ....................... | G06K 7/0008 340/10.1 |

(Continued)

OTHER PUBLICATIONS

International Search Report and Written Opinion for PCT/SE2012/050482, mailed Aug. 10, 2012, 9 pages.

*Primary Examiner* — Dominic E Rego
(74) *Attorney, Agent, or Firm* — Withrow & Terranova, PLLC

(57) ABSTRACT

A method for controlling transmit power in a wireless communication system are disclosed. The method comprises determining a first transmit power of at least a first type of subframe which is higher than a maximum allowed average output power of the radio base station, and a second transmit power of at least a second type of subframe which is lower than the maximum allowed average output power. An average transmit power by which the radio base station transmitted an amount of subframes during a preceding time period is determined. Moreover, a maximum allowed power for a subsequent subframe based on the determined average transmit power and the maximum allowed average output power is determined. Finally, at least one type of subframe to be allowed for the subsequent subframe based on the determined maximum allowed power for the subsequent subframe and at least the first and second transmit power is determined.

22 Claims, 4 Drawing Sheets

(56) References Cited

U.S. PATENT DOCUMENTS

2010/0273518 A1* 10/2010 Suzuki ............... H04W 52/225 455/522
2011/0021235 A1* 1/2011 Laroia ............... H04W 52/367 455/522
2011/0211451 A1* 9/2011 Dattagupta ........ H04N 21/2381 370/235
2012/0002580 A1* 1/2012 Nakashima ........... H04W 52/42 370/311
2012/0270592 A1* 10/2012 Ngai ................... H04W 52/226 455/522

* cited by examiner

METHODS AND ARRANGEMENTS FOR CONTROLLING TRANSMIT POWER IN A RADIO BASE STATION

This application is a 35 U.S.C. §371 national phase filing of International Application No. PCT/SE2012/050482, filed May 7, 2012, the disclosure of which is incorporated herein by reference in its entirety.

TECHNICAL FIELD

The present invention relates to a method in a radio base station and a radio base station for controlling transmit power in a wireless communications system.

BACKGROUND

The Universal Mobile Telecommunication System (UMTS) is one of the 3G mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS system and Evolved UTRAN (E-UTRAN) is the radio access network of an LTE system. The complete cellular system that comprises an LTE system (and thus E-UTRAN) is denoted Evolved Packet System (EPS). A radio access network typically comprises user equipments (UE) wirelessly connected to base stations (BS), commonly referred to as NodeB in UTRAN and eNodeB in E-UTRAN. Each BS serves one or more areas each referred to as cells.

One of the hot topics for future developments of cellular systems is heterogeneous networks. Heterogeneous networks are networks with a mixed deployment of cells of widely different sizes, such as macro cells, micro cells, pico cells, and femto cells. The cells may either cover overlapping areas, e.g., when the area covered by a pico cell is also covered by a macro cell, or they may complement each other's coverage. Smaller cells, such as pico cells, will typically be overlapping with other cells. They will be used, e.g., to provide increased capacity at locations with dense user populations and high traffic volumes, so called hotspots, or to provide improved coverage, e.g., in terms of better channel quality at certain indoor locations.

Deploying small base stations to enhance capacity or coverage seems to be an appealing way for operators to overcome the cumbersome of finding and leasing new macro sites. The main characteristics of these small base stations are that they are smaller in size compared to a typical macro site, easily installed, e.g. they can be attached to lamp posts, walls, etc., and their transmit power is often lower compared to the transmit power of a macro site.

One issue with the deployment of these small base stations is at what extent they can offload macro sites or how large areas they can cover. Simulations with various channel models have shown that this coverage area is typical small to medium compared to the coverage area of a typical macro site. Additionally, the benefits of cell-area splitting gains are usually marginal and deployment of the small base stations does not pay off. One way to increase the coverage area of a small base station is to apply a cell selection offset (CSO) to the cell selection algorithm and thus steer more users to the small base station. This is illustrated in FIG. 1, wherein the small base station 110 have a relatively small coverage area constituting a pico cell 120 due to its low transmit power. A number of UEs 130a are connected to the macro site 140. Some UEs 130b will connect to the small base station 110, thereby offloading the traffic from the macro cells 150. By applying CSO, i.e. by biasing handover decisions between the different base stations such that some UEs 130c are handed over to the small base station earlier than usual, load is shifting from the macro site 140 to the small base station 110. As this corresponds to an expansion of the range of the small base station, this feature is typically referred to as "range expansion".

One potential problem with applying a CSO to the cell selection algorithm is that users in the cell range extended (CRE) area 160, so called CRE users, might be interfered heavily from the macro site in the downlink. This results in a very low downlink Signal-to-Interference Ratio (SIR). This in turn may lead to that users in the CRE area will experience problems in demodulating control and/or data signals, leading to lower performance. One way to mitigate this is to apply muting restrictions in the macro layer. Using so called Almost Blank Subframes (ABS), macro cells are muted, in a static or dynamic way, in order to reduce interference to pico users in the CRE area.

By doing that, protection of both data and control channels of CRE users takes place.

There are mainly two problems with the ABS solution. Firstly, by muting the macro base station precious macro capacity is sacrificed in order to favor transmissions of the small base stations. Secondly, muting the macro base station only helps CRE users when the interference from the macro is what limits their performance. If a low signal strength from the own small base station in comparison with thermal noise is the limiting factor, it does not help to reduce macro interference. Furthermore, in the case of dynamic ABS coordinated scheduling between the macro site and the small base station is required in order for the macro site to be able to mute its transmission at the same time as the small base station schedules its CRE users.

Simulation results have shown that the loss of useful signal power for the CRE users is more important than the interference originating from the near-by macro site. In addition to that, simulations have shown that while increasing the CSO and steering more users to the small base station layer, macro interference becomes less and less important due to the fact that macro utilization drops.

SUMMARY

It is therefore an object to address some of the problems outlined above, and to provide a solution for controlling the transmit power of a radio base station. This object and others are achieved by the method and the base station according to the independent claims, and by the embodiments according to the dependent claims.

In accordance with a first aspect of embodiments a method in a radio base station of a wireless communications system for controlling transmit power is provided. The radio base station has a maximum allowed average output power. The method comprises determining a first transmit power of at least a first type of subframe which is higher than the maximum allowed average output power, and a second transmit power of at least a second type of subframe which is lower than the maximum allowed average output power. Further, the method comprises determining an average transmit power by which the radio base station transmitted an amount of subframes during a preceding time period. Moreover, the method includes determining a maximum allowed power for a subsequent subframe based on the determined average transmit power and the maximum allowed average output power. Finally, the method includes determining at least one type of subframe to be allowed for the subsequent subframe based on the determined maximum allowed power for the subsequent subframe and at least the first and second transmit power.

In accordance with a second aspect of embodiments a radio base station for a wireless communications system is provided. The radio base station is configured to control transmit power. The radio base station has a maximum allowed average output power. The radio base station comprises a processing unit configured to determine a first transmit power of at least a first type of subframe which is higher than the maximum allowed average output power, and a second transmit power of at least a second type of subframe which is lower than the maximum allowed average output power. The processing unit is further configured to determine an average transmit power by which the radio base station transmitted an amount of subframes during a preceding time period and configured to determine a maximum allowed power for a subsequent subframe based on the determined average transmit power and the maximum allowed average output power. Furthermore, the processing unit is configured to determine at least one type of subframe to be allowed for the subsequent subframe based on the determined maximum allowed power for the subsequent subframe and at least the first and second transmit power.

An advantage of embodiments is that the service coverage area of the radio base station is extended.

Another advantage of embodiments is that transmission to UEs with low Signal-to-Noise Ratio (SNR) is supported by the radio base station.

Yet another advantage of embodiments is that the radio base station is configured to avoid exceeding the average transmission power constraint while utilizing available extra transmit power.

Yet a further advantage of embodiments it that no additional signaling or measurements are required in the wireless communications system. Thus, it is a proprietary solution.

Yet a further advantage of embodiments is that the solution is independent of the other radio base stations in the wireless communications system. Hence, there is no need for modifying the transmissions of another radio base station.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of a method and device, they may also be embodied in a computer program product as well as in a system comprising a computer processor and a memory coupled to the processor, wherein the memory is encoded with one or more programs that may perform the functions disclosed herein.

Figure 1:
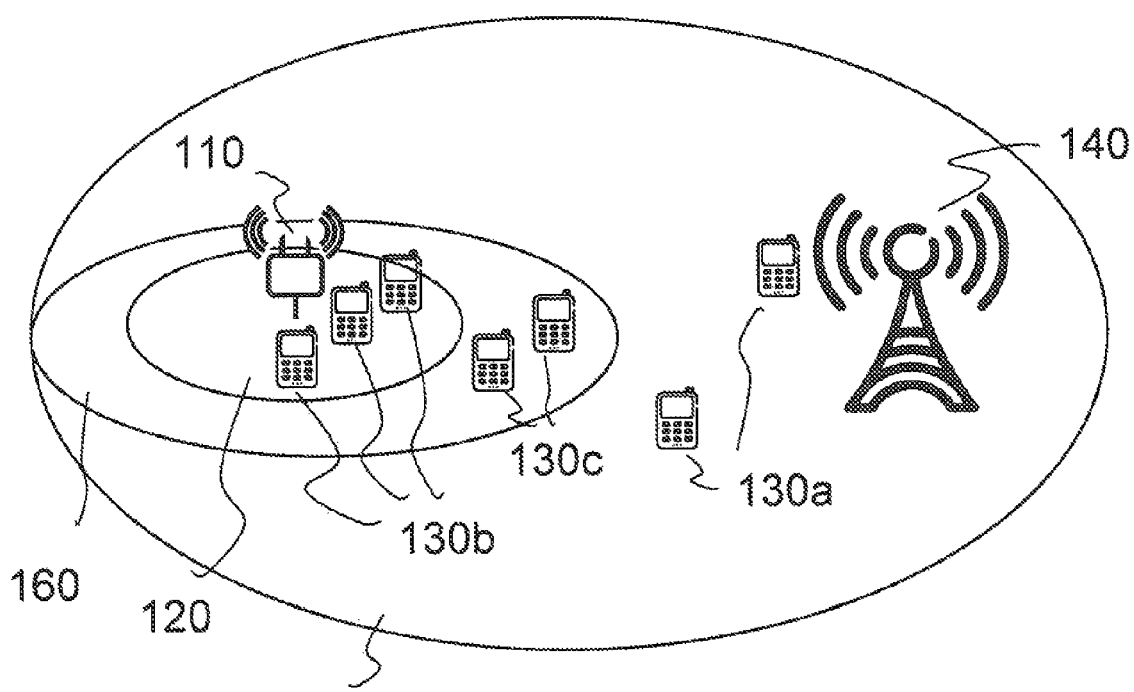
FIG. 1 is a schematic illustration of a wireless communications system wherein cell range expansion is applied.
Figure 2:
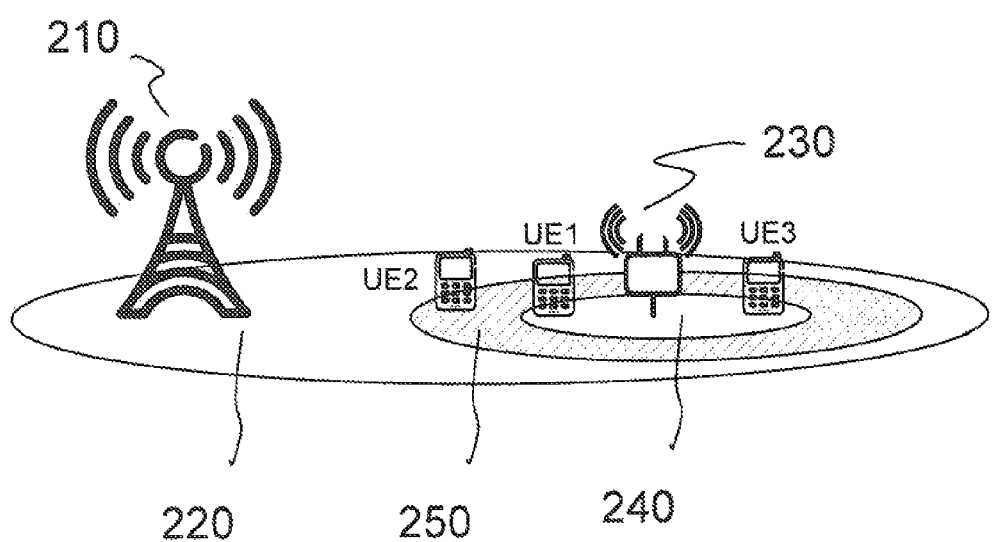
FIG. 2 is a schematic illustration of a wireless communications system in which embodiments of the invention may be implemented.

Embodiments are described herein by way of reference to particular example scenarios. Particular aspects are described in a non-limiting general context in relation to a wireless communications system involving a radio base station which is a high power node 210 such as a macro site covering a macro cell 220 and a radio base station 230 which is a low power node (LPN) such as a pico radio base station (RBS) covering a pico cell 240 as illustrated in FIG. 2. However, although such a scenario is suitable for the description of the embodiments, it should be noted that the LPN may be a local area base station, a home radio base station, a femto radio base station etc. The LPN are fully-featured radio base stations with a limited output power, reduced size and costs in comparison with a high power node such as a macro site or a wide area radio base station. Hence, the LPN can easily be deployed for improving conditions in coverage holes and providing higher data-rates at cell edge or in hot-spots.

The RBS 230 is capable of serving several user equipments when located in the pico cell 240. In FIG. 2 two such UEs are shown, denoted UE1 and UE3. When applying a Cell Selection Offset (CSO) value to the cell selection algorithm, UEs in the cell range extended (CRE) area 250, e.g. UE2 in FIG. 2, might be interfered heavily from the macro site 210 in the downlink as mentioned above causing a low downlink Signal-to-Interference Ratio (SIR).

The low downlink SIR may lead to that the UEs in the CRE area will experience problems in demodulating control and/or data signals, leading to lower performance. By increasing the transmit power of the LPN 230, e.g., to always utilizing the available maximum power of the base station, and hence to enhance the useful signal and Signal-to-Noise Ratio (SNR) of the UEs would protect both data and control channels of the UEs in the CRE area. However, it will not be efficient from an energy perspective. Moreover, it will require bigger cooling devices and higher back up battery requirements for the base station. For the above reasons and in order to keep the size of the low power nodes small, restrictions on the transmit power is applied. These restrictions can be formulated in many different ways such as an absolute maximum output power value or a maximum allowed average output power.

In embodiments of the invention an increased transmit power of the radio base station during certain periods of time is used, while maintaining a sufficiently low output power averaged over a longer time. A certain type of subframe, herein after called enhanced power subframe (ePSF), is transmitted with an increased transmit power. In the ePSF a UE in the CRE area may be scheduled, for example UE2 in FIG. 2. Another type of subframe, herein after called normal power subframe (nPSF), is transmitted with a transmit power which is lower than the increased transmit power. For example, in the nPSF a UE in the non-CRE area may be scheduled. An average transmit power by which the radio base station transmitted an amount of subframes during a preceding time period is determined. Then a maximum allowed power for a subsequent subframe based on the determined average transmit power and the maximum allowed average output power is determined. At least one type of subframe to be allowed for the subsequent subframe is determined based on the determined maximum allowed power for the subsequent subframe and the increased transmit power i.e. the transmit power of the ePSF and the transmit power of the nPSF. The output power averaged over a longer time is maintained sufficiently low by allowing only the type of subframe which has a transmit power sufficiently low. This allows improved Signal-to-Interference-and-Noise Ratio (SINR) for UEs in the CRE area, without stealing capacity of the macro site. Moreover, it allows improved SINR in case the main source of low SINR is macro interference and in case the main source of low SINR is low signal strength.

Another advantage is that there is no need to coordinate scheduling between the macro site and the LPN, since the scheduling decision and power control decision are taken at the same place i.e. in the LPN.

Embodiments provide an alternative solution to ABS that target enhancing performance of low SNR pico users which are located to CRE areas while satisfying the imposed transmit power restrictions.

Figure 3:
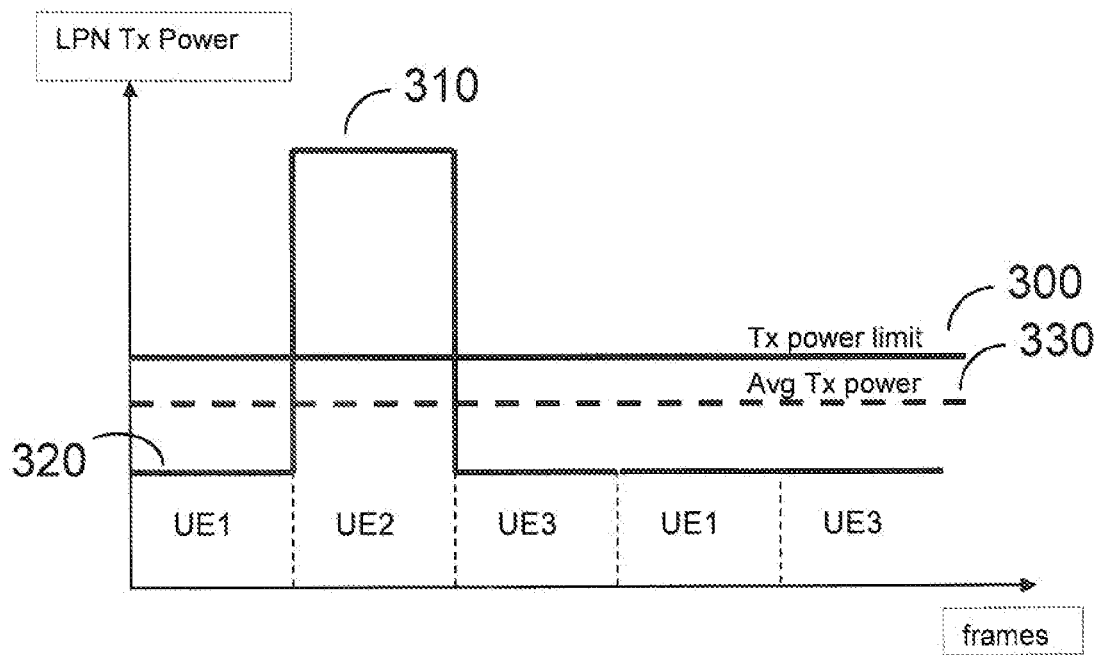
FIG. 3 illustrate an example of how increased transmit power of the radio base station during certain periods of time is used, while maintaining a sufficiently low power level averaged over a longer time according to embodiments of the invention.

FIG. 3 illustrates an example of how increased transmit power of the radio base station during certain periods of time is used, while maintaining a sufficiently low power level averaged over a longer time according to embodiments of the invention. In the exemplary embodiment a configuration comprising two types of subframes, i.e. ePSF and nPSF, is applicable. The radio base station has a maximum allowed average output power called Tx power limit and shown as a continuous line 300 in FIG. 3. The RBS is capable of transmitting ePSFs with a temporal peak power 310 which is higher than the maximum allowed average output power. Hence, the radio base station is able to operate with a varying output power. The nPSF is transmitted with a transmit power 320 which is lower than the maximum allowed average output power. The output power averaged over a longer time called Avg Tx power and shown as a dashed line 330 in FIG. 3 is maintained sufficiently low by allowing the subsequent subframe to be transmitted to be of either type ePSF or nPSF. In one embodiment the transmit powers of the different type of subframes are predetermined in the radio base station. In another embodiment the transmit powers are calculated by the radio base station, e.g. in accordance with the algorithm disclosed below in connection with FIG. 4.

For example, UE1 and UE3 in FIG. 2 which are closer to the LPN and reside in the non-CRE area 240 and experience typical high SNRs can receive data at a low transmit power without sacrificing a lot on their performance. Therefore the RBS 230 schedule UE1 and UE3 in nPSFs which are transmitted with the lower transmit power. The remaining transmit power can then be used for transmitting data to UE2 in an ePSF because UE2 which resides in the CRE area 250 has typical low SNR and will benefit most from the higher transmit power.

In another embodiment, several types of subframes can be employed offering better granularity for setting transmit power levels and better utilization of the available resources. If more than two types of subframes each associated with a certain transmit power are allowed then extra signaling to the UE is needed in the case when Common Reference Signal (CRS) assisted signal demodulation is deployed. In case user specific Reference Signal (RS) such as Demodulation RS (DMRS) is used then there is no need for additional signaling.

Figure 4:
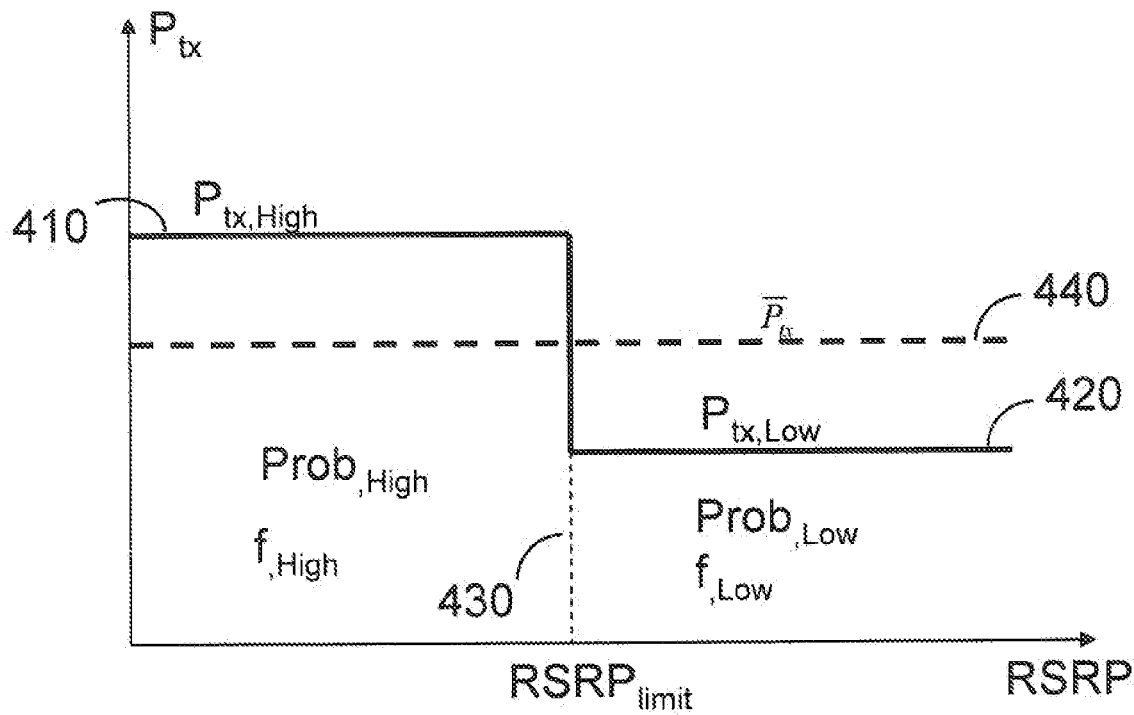
FIG. 4 is another example of how increased transmit power of the radio base station during certain periods of time is used, while maintaining a sufficiently low power level averaged over a longer time according to embodiments of the invention

An exemplary embodiment is illustrated in FIG. 4. In order to keep the following description simple, we will assume only two types of subframes, ePSF and nPSF, each associated with a certain transmit power, $P_{tx,High}$ 410 and $P_{tx,Low}$ 420, respectively. One metric for classifying UEs as low-end performance (low SNR) is the Reference Signal Received Power (RSRP). RSRP is reported by a UE served by the RBS and hence the RBS can keep track of the users which are in areas with limited coverage. Based on a RSRP threshold value $RSRP_{limit}$ 430, UEs can be classified and scheduled in a nPSF or ePSF. The $RSRP_{limit}$ 430 may correspond to either a static value or a dynamic value that the RBS calculates on every several subframes.

UEs reporting higher RSRP values than or equal to the RSRP threshold value are scheduled in nPSFs with relatively low power $P_{tx,Low}$, and UEs reporting lower RSRP than the RSRP threshold value are scheduled in ePSFs which are transmitted with a relatively high power $P_{tx,High}$. The RSRP threshold value may be predetermined in the RBS or calculated in the RBS. A fraction of UEs ($f_{High}$) will be scheduled in ePSFs and the rest ($f_{Low}$) will be scheduled in nPSFs. Hence:

$$f_{High} + f_{Low} = 1 \quad (1)$$

Each fraction of UEs will be scheduled with a certain probability ($Prob_{High}$ or $Prob_{Low}$) based on the utilization of the corresponding UEs, so that the sum is equal to cell utilization (U). Hence:

$$Prob_{High} + Prob_{Low} = U \quad (2)$$

If we assume a linear relation between the fraction of UEs in each set and the probability of each set to be scheduled, we get:

$$Prob_{High} = U \cdot f_{High}$$

and $$Prob_{Low} = U \cdot f_{Low} \quad (3)$$

Based on the above assumptions and equations 1-3, the RBS can calculate the two transmit power levels used in each type of subframe, i.e. $P_{tx,Low}$ and $P_{tx,High}$. To do this, it first calculates the average transmit power as a function of the high and low power levels.

$$\overline{P}_{tx} = \sum_{i=1}^{2} P_{tx,i} \cdot Prob_i = P_{tx,High} \cdot Prob_{High} + P_{tx,low} \cdot Prob_{Low} \leq \overline{P}_{max} \Rightarrow \quad (4)$$

$$P_{tx,High} \cdot f_{High} + P_{tx,Low} \cdot f_{Low} \leq \frac{\overline{P}_{max}}{U}$$

Where $\overline{P}_{tx}$, shown as a dashed line 440 in FIG. 4, is the average transmit power over a time window and $\overline{P}_{max}$ is the maximum allowed average output power of the RBS defined for example by the transmit power constraint. The above equation provides an infinite number of possible combinations for the transmit power levels. However, a second equation describing a fairness criterion between the two levels will provide a unique set as a solution. In one embodiment this equation can be in the form of:

$$P_{tx,High} = 2 \cdot P_{tx,Low} \quad (5)$$

This ensures that the difference of the two levels is a factor of two, or 3 dB. It should be pointed out that the criterion may be set in different ways. Another criterion may be to determine an SNR target value, for example to set SNR to 10 dB, for the CRE users. From the SNR target value, the pathgain and the noise power, the required transmit power of the ePSF, i.e. $P_{tx,High}$, can be calculated. Further, the transmit power of the nPSF, i.e. $P_{tx,Low}$, can be calculated with Equation (4).

Based on the above set of configurations, a Radio Resource Management (RRM) function of the RBS applies constraints on which UE may be scheduled in which type of subframe. Based on the maximum allowed average output power of the RBS $\bar{P}_{max}$, the averaged transmit power over a set of consecutive subframes N is:

$$\bar{P}_{tx}(t) = \frac{1}{N} \cdot \sum_{\tau=t-N+1}^{t} P_{tx}(\tau) \leq \bar{P}_{max} \quad (6)$$

where the amount of subframes N are equal to the size of the time window. Hence on time instant t, a transmit power $P_{tx}(t)$ should be:

$$\bar{P}_{tx}(t) = \frac{1}{N} \cdot \left( \sum_{\tau=t-N+1}^{t-1} P_{tx}(\tau) + P_{tx}(t) \right) \leq \bar{P}_{max} \Rightarrow \quad (7)$$

$$P_{tx}(t) \leq N \cdot \bar{P}_{max} - \sum_{\tau=t-N+1}^{t-1} P_{tx}(\tau) = P_{max}(t)$$

In case of a predefined set of transmit power levels the RRM function allows for the subsequent subframe to be of the type of subframe which associated transmit power level satisfy the following equation:

$$P(t) = P_{tx,u} \leq P_{max}(t) \quad (8)$$

In one embodiment the RBS further schedules a UE or a set of UEs in the allowed type of subframe based on a required transmit power associated with the UE or the set of UEs. As mentioned above, UEs reporting higher RSRP values than or equal to the RSRP threshold value are scheduled in nPSFs with relatively low power $P_{tx,Low}$, and UEs reporting lower RSRP than the RSRP threshold value are scheduled in ePSFs which are transmitted with a relatively high power $P_{tx,High}$.

In embodiments wherein dynamic transmit power levels are supported, the RRM function selects an arbitrary UE and serves it with a power of at most:

$$P(t) = P_{max}(t) \quad (9)$$

The above analysis can be generalized for more than two transmit power levels. In case the power levels are continuous and not discrete, e.g. when DMRS is used, then equation 4 becomes:

$$E[P_{tx}] = \int P_{tx}(RSRP) \cdot f(RSRP) dRSRP \quad (10)$$

where $P_{tx}$ and f are two continuous functions of RSRP.

Figure 5:
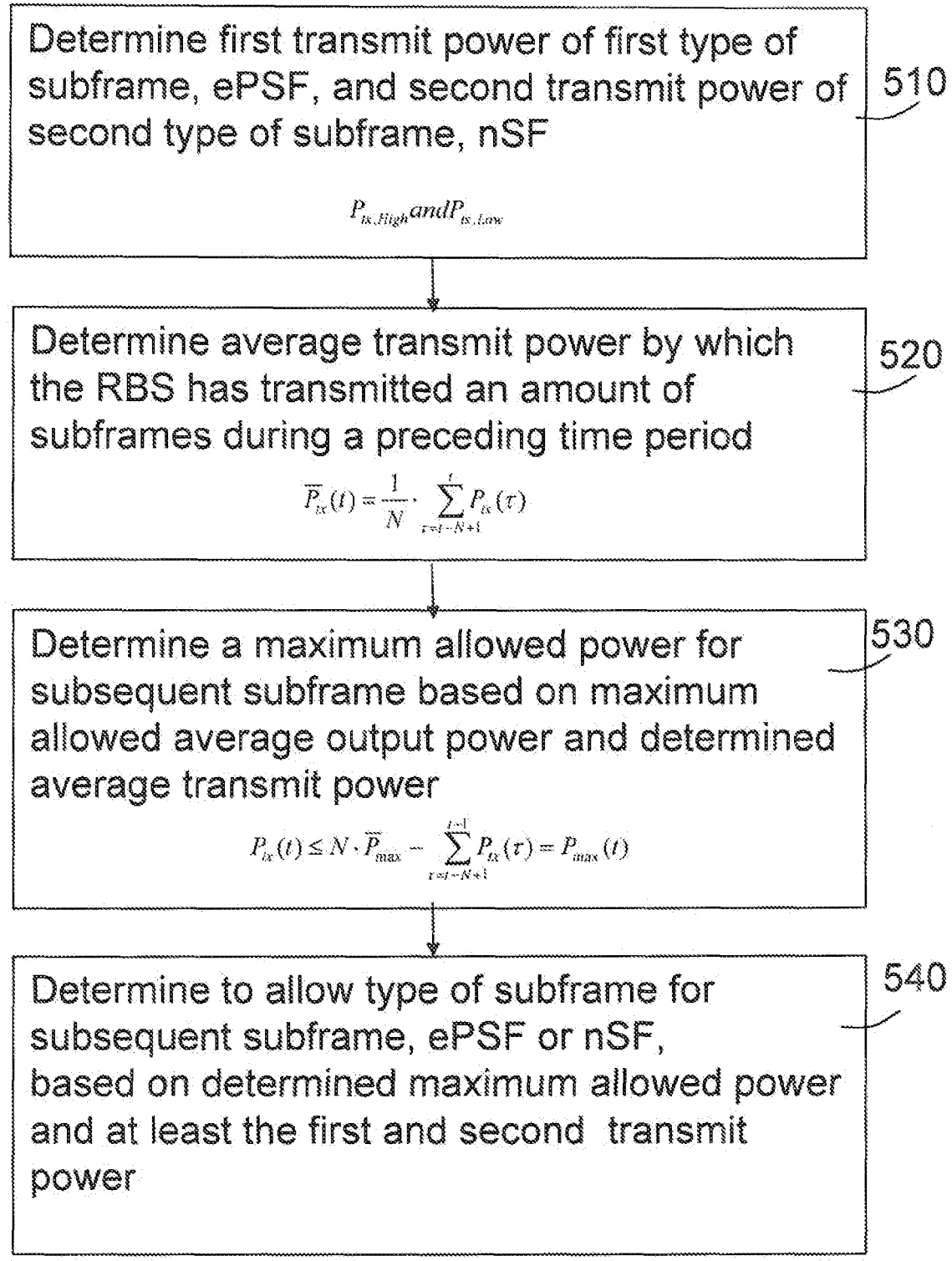
FIG. 5 is a flowchart of the method in the RBS according to embodiments.

FIG. 5 is a flowchart illustrating the method in a RBS of a wireless communications system, according to embodiments. The RBS has a maximum allowed average output power, i.e. the output power of the RBS during a certain time period is restricted. The RBS may be a LPN 230 as mentioned above in connections with FIG. 2. The method comprises determining 510 a first transmit power of a first type of subframe which is higher than the maximum allowed average output power, and a second transmit power of a second type of subframe which is lower than the maximum allowed average output power. In one embodiment there are more than two types of subframes. However, each type of subframe is transmitted with a certain transmit power. In another embodiment, the power levels are continuous and not discrete. In one embodiment the first transmit power and the second transmit power are predetermined in the RBS. Alternatively, they are calculated by the RBS.

Furthermore, the method comprises determining 520 an average transmit power by which the radio base station has transmitted an amount of subframes during a preceding time period. In one embodiment this may be calculated according to Equation (6). The method also includes determining 530 a maximum allowed power for a subsequent subframe based on the determined average transmit power and the maximum allowed average output power. In one embodiment, the maximum allowed power for the subsequent subframe is calculated according to Equation (7) mentioned above, i.e. as the power that would result in that the average transmit power after transmission of the subsequent subframe equals the maximum allowed average output power.

The maximum allowed power for the subsequent subframe to be transmitted is determined in order not to exceed the maximum allowed average output power. Based on the determined maximum allowed power for the subsequent subframe and at least the first transmit power and the second transmit power, at least one type of subframe to be allowed for the subsequent subframe is determined 540.

Furthermore, the second type of subframe is allowed when the maximum allowed power for the subsequent subframe is determined to be higher than or equal to the second transmit power. The first type of subframe is allowed when the maximum allowed power for the subsequent subframe is higher than or equal to the first transmit power. However, when the determined maximum allowed power for the subsequent subframe is lower than both the first transmit power and second transmit power none of the first or second type of subframe is allowed. Hence, the RBS must be silent in the subsequent subframe in order not to exceed the maximum allowed average output power.

It should be pointed out that the order of the different steps in the method described above could be performed in other orders than what is illustrated in FIG. 5. For example, the step of determining the transmit power of the types of subframes could be performed after the step shown as step 520 and 530.

In an exemplary embodiment, the RBS further schedules a UE either in the first type of subframe or in the second type of subframe based on a required transmit power associated with the UE. In one embodiment, the required transmit power may be based on a RSRP value which is reported by each UE being served by the RBS. The low RSRP value indicates whether the UE is located far away from the RBS and therefore also requires a type of subframe transmitted with a higher transmit power. That is, the UE reports a RSRP value to the RBS and if the value is high, e.g. higher than or equal to a determined RSRP threshold value, the UE is scheduled in the second type of subframe, e.g. a nPSF, which is transmitted with a relatively low power, and if the value is low, e.g. lower than the RSRP threshold value, the UE is scheduled in the first type of subframe, e.g. an ePSF, which is transmitted with a relatively high power.

In one embodiment the RSRP threshold value is a static value. Alternatively, the threshold value is a dynamic value calculated by the RBS.

In another exemplary embodiment, the required transmit power associated with the UE is based on whether the user equipment is assigned a CSO value. The assignment of a CSO value indicates whether the UE is located in a CRE area and therefore requires a type of subframe transmitted with a higher transmit power. The RBS determines whether the UE is assigned a CSO value, schedules the UE in the first type subframe, e.g. an ePSF, if the user equipment is assigned a CSO value and in the second type of subframe, e.g. nPSF, if the UE is not assigned a CSO value.

In an exemplary embodiment, the RBS has an output power constraint at 200 mW which defines the maximum allowed average output power of the RBS i.e. $\bar{P}_{max}$=200 mW. The RBS determines a first transmit power of a first type of subframe which is higher than the maximum allowed average output power and a second transmit power of a second type of subframe which is lower than the maximum allowed average output power. For example, if the fraction of UEs which will be scheduled in ePSFs is set to $f_{High}$=0.6 and the rest that will be scheduled in nPSFs is set to $f_{Low}$=0.4. The first transmit power $P_{tx,high}$ is determined to be twice the second transmit power i.e. $P_{tx,high}$=$2*P_{tx,low}$. If cell utilization is U=0.25, according to Equation (4):

$$2*P_{tx,low}*0.6+P_{tx,low}*0.4 \leq 0.2/0.25=0.8$$

This yields that the first transmit power $P_{tx,high}$=1 W and the second transmit power $P_{tx,low}$=0.5 W.

Further, assume that N=100, and that during the last 99 subframes, the ePSF with the high power has been used $N_{high}$=10 times and the nPSF with the low power $N_{low}$=15 times. The RBS determines a maximum allowed power for a subsequent subframe $P_{tx}(t)$ based on an average transmit power by which the RBS has transmitted the amount of subframes during a preceding period and the maximum allowed average output power. Thus, according to Equation (7), $$P_{tx}(t) \leq 100*0.2-(10*1+15*0.5)=2.5 \text{ W}$$

The RBS must thus use a transmit power lower than 2.5 W when transmitting the subsequent subframe in order not to exceed the power limit. The RBS determines which type of subframe to be allowed for the subsequent subframe, i.e. if nPSF and/or ePSF are allowed. In this example both the first and the second type of subframe are allowed the maximum allowed power for the subsequent subframe is higher than the both the first and the second transmit power.

Furthermore, at a later instance, assume that $N_{high}$=10 and $N_{low}$=20. Then the maximum allowed power for a subsequent subframe is $$P_{tx}(t) \leq 100*0.2-(10*1+20*0.5)=0 \text{ W}$$

The RBS determines that no type of subframe is allowed because the maximum allowed power for the subsequent subframe is lower than both the ePSF and the nPSF. Thus, the RBS must be silent in the subsequent subframe in order not to exceed the maximum allowed average output power of the RBS.

Figure 6A:
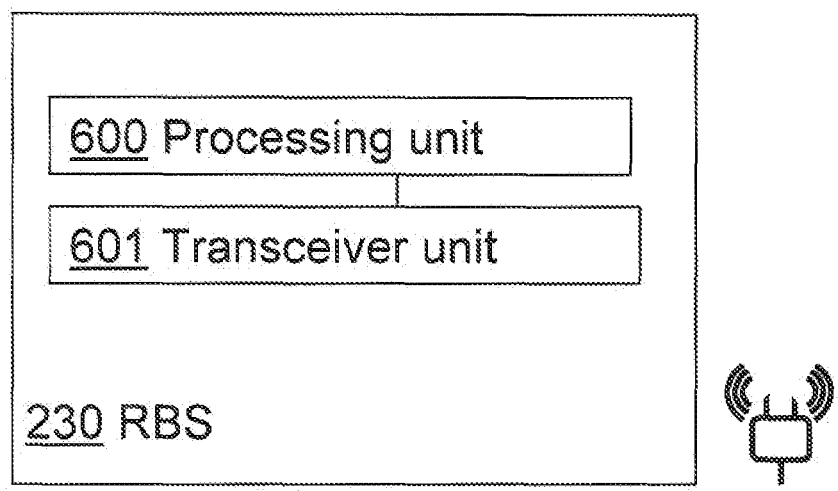
FIGS. 6a-6b are block diagrams illustrating the RBS according to embodiments.

A RBS 230 for a wireless communications system is schematically illustrated in the block diagram in FIG. 6a, according to embodiments. The RBS 230 is configured to control transmit power. The RBS has a maximum allowed average output power. The RBS comprises a processing unit 600 configured to determining a first transmit power of a first type of subframe which is higher than the maximum allowed average output power and a second transmit power of a second type of subframe which is lower than the maximum allowed average output power. Moreover, the processing unit 600 is further configured to determining an average transmit power by which the radio base station has transmitted an amount of subframes during a preceding time period. In one embodiment, the average transmit power is calculated in accordance with Equation (6) mentioned above. The processing unit 600 is further configured to determining a maximum allowed power for a subsequent subframe based on the determined average transmit power and the maximum allowed average output power. In one embodiment, the maximum allowed power is calculated in accordance with Equation (7) mentioned above.

Furthermore, the processing unit 600 is configured to determining at least one type of subframe to be allowed for the subsequent subframe based on the determined maximum allowed power for the subsequent subframe and at least the first and second transmit power. The RBS 230 also comprises a transceiver unit 601 for communicating with the UEs.

In a further embodiment the processing unit 600 is configured to scheduling a UE in the first type of subframe or in the second type of subframe based on a required transmits power associated with the UE in accordance with the method described above.

The units described above with reference to FIG. 6a are logical units and do not necessarily correspond to separate physical units.

Figure 6B:
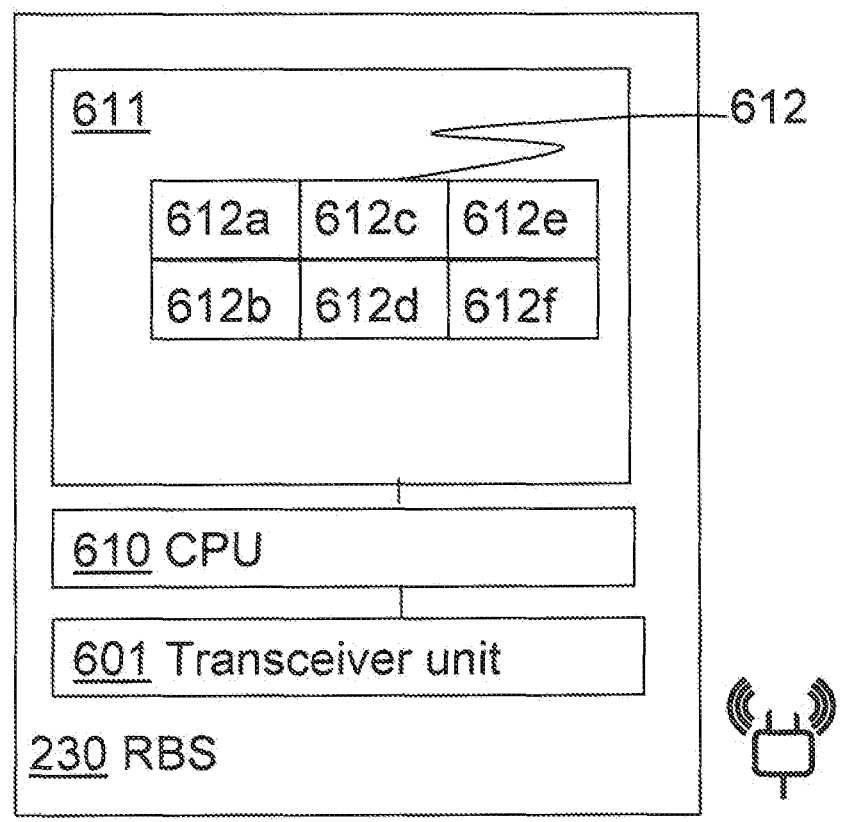

FIG. 6b schematically illustrates an embodiment of the RBS 230, which is an alternative way of disclosing the embodiment illustrated in FIG. 6a. The RBS 230 comprises the communication unit 601 already described above with reference to FIG. 6a. The RBS 230 also comprises a Central Processing Unit (CPU) 610 which may be a single unit or a plurality of units. Furthermore, the RBS 230 comprises at least one computer program product 611 in the form of a non-volatile memory, e.g. an EEPROM (Electrically Erasable Programmable Read-Only Memory), a flash memory or a disk drive. The computer program product 611 comprises a computer program 612, which comprises code means which when run on the RBS 230 causes the CPU 610 on the RBS 230 to perform the steps of the method described earlier in conjunction with FIG. 5.

Hence in the embodiments described, the code means in the computer program 612 of the RBS 230 comprises a module 612a for determining transmit power of the first and second type of subframes. The computer program 612 also comprises a module 612b for determining an average transmit power by which the radio base station has transmitted an amount of subframes during a preceding time period. The computer program 612 further includes a module 612c for determining a maximum allowed power for a subsequent subframe based on the determined average transmit power and the maximum allowed average output power. In addition the computer program 612 further includes a module 612d for determining at least one type of subframe to be allowed for the subsequent subframe based on the determined maximum allowed power for the subsequent subframe and the first and second transmit power. In one embodiment the computer program 612 further includes a module 612e for determining a RSRP or CSO value of a UE and a module 612f for scheduling the UE in either the first type of subframe or the second type of subframe dependent on the value. The code means may thus be implemented as computer program code structured in computer program modules. The modules 612a-f essentially perform the steps of the flow described in connection with FIG. 5 to emulate the RBS described in FIG. 6a. In other words, when the different modules 612a-f are run on the CPU 610, they correspond to the processing unit 600 of FIG. 6a.

Although the code means in the embodiments disclosed above in conjunction with FIG. 6b are implemented as computer program modules, one or more of the code means may in alternative embodiments be implemented at least partly as hardware circuits.

The above mentioned and described embodiments are only given as examples and should not be limiting. Other solutions, uses, objectives, and functions within the scope of the accompanying patent claims may be possible.

The invention claimed is:

1. A method in a radio base station of a wireless communications system for controlling transmit power, wherein the radio base station has a maximum allowed average output power, the method comprising:
    determining a first transmit power of at least a first type of subframe which is higher than the maximum allowed average output power, and a second transmit power of at least a second type of subframe which is lower than the maximum allowed average output power,
    determining an average transmit power by which the radio base station transmitted an amount of subframes during a preceding time period,
    determining a maximum allowed power for a subsequent subframe based on the determined average transmit power and the maximum allowed average output power; and
    determining at least one type of subframe to be allowed for the subsequent subframe based on the determined maximum allowed power for the subsequent subframe and at least the first and second transmit power.

2. The method according to claim 1, wherein the first transmit power and the second transmit power are predetermined.

3. The method according to claim 1, wherein the first transmit power and the second transmit power are calculated by the radio base station.

4. The method according to claim 1, wherein the second type of subframe is allowed when the determined maximum allowed power for the subsequent subframe is higher than or equal to the second transmit power.

5. The method according to claim 1, wherein the first type of subframe is allowed when the maximum allowed power for the subsequent subframe is higher than or equal to the first transmit power.

6. The method according to claim 1, wherein no type of subframe is allowed when the determined maximum allowed power for the subsequent subframe is lower than both the first transmit power and the second transmit power.

7. The method according to claim 1, wherein the maximum allowed power for the subsequent subframe is calculated as the power that would result in that the average transmit power after transmission of the subsequent subframe equals the maximum allowed average output power.

8. The method according to claim 1, the method further comprises scheduling a user equipment in the first type of subframe or in the second type of subframe based on a required transmit power associated with the user equipment.

9. The method according to claim 8, wherein the required transmit power associated with the user equipment is based on a Reference Signal Received Power, RSRP, value reported by the user equipment, the method further comprises determining a RSRP value of the user equipment, and the scheduling comprises scheduling the user equipment in the first type of subframe if the RSRP value is below a RSRP threshold value or in the second type of subframe if the RSRP value is above or equal to the RSRP threshold value.

10. The method according to claim 9, wherein the RSRP threshold value is a static value or a dynamic value calculated by the radio base station.

11. The method according to claim 8, wherein the required transmit power associated with the user equipment is based on whether the user equipment is assigned a Cell Selection Offset, CSO, value, the method further comprise determining whether the UE is assigned a CSO value, and the scheduling comprises scheduling the user equipment in the first type subframe if the user equipment is assigned a CSO value and in the second type of subframe if the user equipment is not assigned a CSO value.

12. A radio base station for a wireless communications system comprising a processing unit configured to:
    determine a first transmit power of at least a first type of subframe which is higher than the maximum allowed average output power, and a second transmit power of at least a second type of subframe which is lower than the maximum allowed average output power,
    determine an average transmit power by which the radio base station transmitted an amount of subframes during a preceding time period, determining a maximum allowed power for a subsequent subframe based on the determined average transmit power and the maximum allowed average output power; and
    determine at least one type of subframe to be allowed for the subsequent subframe based on the determined maximum allowed power for the subsequent subframe and at least the first and second transmit power.

13. The radio base station according to claim 12, wherein the first transmit power and the second transmit power are predetermined.

14. The radio base station according to claim 12, wherein the first transmit power and the second transmit power are calculated by the radio base station.

15. The radio base station according to claim 12, wherein the second type of subframe is allowed when the determined maximum allowed power for the subsequent subframe is higher than or equal to the second transmit power.

16. The radio base station according to claim 12, wherein the first type of subframe is allowed when the maximum allowed power for the subsequent subframe is higher than or equal to the first transmit power.

17. The radio base station according to claim 12, wherein no type of subframe is allowed when the determined maximum allowed power for the subsequent subframe is lower than both the first transmit power and the second transmit power.

18. The radio base station according to claim 12, wherein the maximum allowed power for the subsequent subframe is calculated as the power that would result in that the average transmit power after transmission of the subsequent subframe equals the maximum allowed average output power.

19. The radio base station according to claim 12, the processing unit is further configured to scheduling a user equipment in the first type of subframe or in the second type of subframe based on a required transmit power associated with the user equipment.

20. The radio base station according claim 19, wherein the required power associated with the user equipment is based on a Reference Signal Received Power, RSRP, value reported by the user equipment, the processing unit is further configured to determine a RSRP value of a user equipment, and the processing unit is configured to schedule the user equipment by scheduling the user equipment in the first type of subframe if the RSRP value is below a RSRP threshold value or in the second type of subframe if the RSRP value is above or equal to the RSRP threshold value.

21. The radio base station according to claim 20, wherein the RSRP threshold value is a static value or a dynamic value calculated by the radio base station.

22. The radio base station according to claim 19, wherein the required transmit power associated with the user equipment is based on whether the user equipment is assigned a Cell Selection Offset, CSO, value, the processing unit is further configured to determine whether the user equipment is assigned a CSO value, and the processing unit is configured to schedule the user equipment by scheduling the user equipment in the first type subframe if the user equipment is assigned a CSO value and in the second type of subframe if the user equipment is not assigned a CSO value.

* * * * *